(12) United States Patent
Weaver et al.

(10) Patent No.: US 8,097,566 B2
(45) Date of Patent: Jan. 17, 2012

(54) METHODS OF FRACTURING SUBTERRANEAN FORMATIONS USING SULFONATED GELLING AGENT POLYMERS

(75) Inventors: Jimmie D. Weaver, Duncan, OK (US); Billy F. Slabaugh, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/869,141

(22) Filed: Aug. 26, 2010

(65) Prior Publication Data

US 2010/0319922 A1 Dec. 23, 2010

Related U.S. Application Data

(63) Continuation of application No. 11/361,239, filed on Feb. 24, 2006, which is a continuation-in-part of application No. 10/670,410, filed on Sep. 24, 2003, now abandoned.

(51) Int. Cl.
*C09K 8/60* (2006.01)

(52) U.S. Cl. .................. 507/219; 166/280.1; 166/305.1

(58) Field of Classification Search .................. None
See application file for complete search history.

(56) References Cited

U.S. PATENT DOCUMENTS

| | | | |
|---|---|---|---|
| 2,626,239 A | 1/1953 | Wagner et al. | |
| 3,046,272 A | 7/1962 | Strating et al. | |
| 3,378,074 A | 4/1968 | Kiel | |
| RE29,219 E | 5/1977 | Flournoy et al. | |
| 4,031,305 A | 6/1977 | DeMartino | |
| 4,107,057 A | 8/1978 | Dill et al. | |
| 4,488,601 A | 12/1984 | Hammett | |
| 4,524,003 A | 6/1985 | Borchardt | |
| 4,540,510 A | 9/1985 | Karl | |
| 4,619,773 A * | 10/1986 | Heilweil et al. | 507/121 |
| 4,903,768 A | 2/1990 | Shu | |
| 5,008,025 A | 4/1991 | Hen | |
| 5,062,969 A | 11/1991 | Holtmyer et al. | |
| 5,179,083 A | 1/1993 | Zody et al. | |
| 5,292,367 A | 3/1994 | Bloys et al. | |
| 5,552,462 A | 9/1996 | Yeh | |
| 5,566,760 A | 10/1996 | Harris | |
| 6,124,244 A | 9/2000 | Murphey | |
| 6,133,204 A | 10/2000 | Newhouse et al. | |
| 6,281,172 B1 | 8/2001 | Warren et al. | |
| 6,756,345 B2 | 6/2004 | Pakulski et al. | |
| 6,844,296 B2 | 1/2005 | Dawson et al. | |
| 6,913,081 B2 | 7/2005 | Powell et al. | |
| 2005/0065040 A1 | 3/2005 | Weaver et al. | |

OTHER PUBLICATIONS

Water Encyclopedia, Natural Brines, 2010, six pages.*
Wikipedia, Seawater, 2010, four pages.*

* cited by examiner

*Primary Examiner* — Robert Sellers
(74) *Attorney, Agent, or Firm* — Robert A. Kent; McDermott Will & Emery LLP

(57) ABSTRACT

Methods of forming one or more fractures in a subterranean formation penetrated by a well bore including the steps of providing a high ionic strength treating fluid that comprises water and one or more sulfonated gelling agent polymers wherein the high ionic strength treating fluid comprises one or more water soluble salts in a concentration of greater than about 8% by weight of the treating fluid, and introducing the treating fluid into the subterranean formation at a rate and pressure sufficient to create or enhance one or more fractures therein.

11 Claims, No Drawings

US 8,097,566 B2

METHODS OF FRACTURING SUBTERRANEAN FORMATIONS USING SULFONATED GELLING AGENT POLYMERS

CROSS-REFERENCE TO RELATED APPLICATIONS

This application is a continuation of copending U.S. patent application Ser. No. 11/361,239, entitled "Methods and Compositions for Treating Subterranean Formations Using Sulfonated Gelling Agent Polymers," filed on Feb. 24, 2006, currently pending, which is a continuation-in-part of U.S. patent application Ser. No. 10/670,410, entitled "Methods and Compositions for Treating Subterranean Formations Using High Ionic Strength Gelling Agent Polymers," filed on Sep. 24, 2003, now abandoned, the entirety of which is herein incorporated by reference.

BACKGROUND OF THE INVENTION

The present invention relates to treating fluids comprising sulfonated gelling agent polymers, and methods of use in treating subterranean formations.

Viscous treating fluids are used in a variety of operations and treatments in oil and gas wells. Such operations and treatments include forming gravel packs in well bores, fracturing producing zones, performing permeability control treatments and the like. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof.

Hydrocarbon producing wells are often stimulated by hydraulic fracturing treatments. In hydraulic fracturing, a viscous fracturing fluid, which also functions as a carrier fluid, is pumped into a subterranean formation to be fractured at a rate and pressure such that one or more fractures are formed or enhanced in the formation. "Enhancing" one or more fractures in a subterranean formation, as that term is used herein, is defined to include the extension or enlargement of one or more natural or previously created fractures in the subterranean formation. Proppant particles, e.g., graded sand, for propping the fractures open are suspended in the fracturing fluid and are deposited in the fractures when the fracturing fluid viscosity is reduced. The fracturing fluid viscosity is reduced by including a delayed viscosity breaker in the fracturing fluid that causes it to revert to a thin fluid. The proppant particles deposited in the fractures function to prevent the fractures from closing so that conductive channels are formed through which produced hydrocarbons can readily flow.

Aqueous treating fluids are generally viscosified by mixing a hydratable polysaccharide gelling agent polymer with water. For example, guar gum and its derivatives are often used to viscosity aqueous fracturing fluids. Guar gum is a random coil polymer that can be readily crosslinked with various cross-linking agents, e.g., metal ions. Once crosslinked, guar and guar derivatives can form highly viscoelastic gels that approach near zero suspended particle settling rates.

Often increasing the effectiveness of gelling agent polymers is desirable, and this has been achieved to a significant degree by grafting ionic groups, for example carboxyl groups, onto the gelling agent polymer chain. Since like charges tend to repel each other, the carboxyl groups are thought to force the flexible coiled polymer to become more linear. Maximizing the linearity is thought to result in an enlarged radius of gyration, which in turn is thought to result in a lesser amount of gelling agent being required to generate a gelled treating fluid.

One problem with using gelling agent polymers comprising ionic groups is that the viscosity-increasing effect of carboxyl groups is thought to be greatly reduced as the pH of the fluid drops below 7. This is thought to be due to the fact that the carboxylate ions are salts of weak acids and tend to hydrolyze. In addition, the solubility of anionic groups in water containing multivalent metal ions such as calcium and magnesium is low, making gelling agent polymers containing anionic groups, e.g., carboxyl groups, generally less soluble in hard water. Thus, anionic groups is thought to render the viscosity of a treating fluid that comprises conventional gelling agent polymers sensitive to ionic strength, whereby the viscosity of the treating fluid that comprises one or more water soluble salts is thought to be much less than the viscosity in fresh water. This sensitivity to ionic strength may be undesirable since the aqueous liquids used in well treating fluids often contain salts, for example, when the treating fluid comprises saltwater, brines, seawater, produced water (e.g., naturally-occurring water found in a subterranean formation), or flowback water (e.g., water that was previously placed in a subterranean formation, for example, in the course of performing another operation), when the subterranean formation comprises salts that dissolve in the treating fluid, and/or as an additive to inhibit swelling of formation clays.

SUMMARY OF THE INVENTION

The present invention relates to treating fluids comprising sulfonated gelling agent polymers, and methods of use in treating subterranean formations.

In one embodiment, the present invention provides a method of treating a subterranean formation penetrated by a well bore comprising: providing a treating fluid that comprises water and one or more sulfonated gelling agent polymers; and introducing the treating fluid into the subterranean formation.

In another embodiment, the present invention provides a method of forming one or more fractures in a subterranean formation penetrated by a well bore comprising: providing a treating fluid that comprises water and one or more sulfonated gelling agent polymers; and introducing the treating fluid into the subterranean formation at a rate and pressure sufficient to create or enhance one or more fractures therein.

In another embodiment, the present invention provides a high ionic strength treating fluid composition for treating a subterranean formation comprising water and one or more sulfonated gelling agent polymers.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to treating fluids comprising sulfonated gelling agent polymers, and methods of use in treating subterranean formations.

The treating fluids of the present invention generally comprise water and one or more sulfonated gelling agent polymers. The methods of the present invention for treating subterranean formations penetrated by well bores generally comprise providing a treating fluid that comprises water and one or more sulfonated gelling agent polymers; and introducing the treating fluid into a subterranean formation. The treating fluids of the present invention may exhibit, among other things, decreased sensitivity to low pH, high ionic strength conditions, and/or hard water. This may, inter alia, provide increased viscosity to the treating fluids of the present invention.

In certain embodiments, the treating fluids used in the present invention may comprise a "high ionic strength treating fluid," which refers to a fluid (or portion thereof) that comprises a substantial amount of water-soluble salts. In certain embodiments, a high ionic strength treating fluid may comprise one or more water soluble salts in a concentration of greater than about 1% by weight of the treating fluid. In certain embodiments, a high ionic strength treating fluid may comprise one or more water soluble salts in a concentration of greater than about 8% by weight of the treating fluid. In certain embodiments, a high ionic strength treating fluid may comprise one or more water soluble salts in a concentration of greater than about 20% by weight of the treating fluid.

The water utilized in the treating fluids of this invention may comprise fresh water, salt water (e.g., brines or seawater), produced water, flowback water, or a combination thereof. The term "produced water" is defined herein to include any naturally-occurring water found in a subterranean formation. The term flowback water is defined herein to include any water (or treating fluid comprising water) that was previously placed in a subterranean formation, for example, in the course of performing another operation.

The one or more sulfonated gelling agent polymers used in the present invention may include, but are not limited to the following: sulfonated biopolymers such as xanthan, scleroglucan and succinoglycan; sulfonated synthetic polymers such as sulfonated polyvinyl alcohols, sulfonated polyacrylamides, and sulfonated polyacrylates; sulfonated acrylamide/acrylic acid copolymers; sulfonated polysaccharides; sulfonated polysaccharide derivatives; and derivatives thereof. The term "derivative," as used herein, includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Sulfonated polysaccharides include, but are not limited to, sulfonated galactomannan gums such as guar gum, gum arabic, gum ghatti, gum karaya, tamarind gum, locust bean gum, sulfonated cellulose derivatives, and derivatives thereof. Examples of suitable sulfonated galactomannan gum polymers include sulfonated guar, sulfonated hydroxypropylguar, sulfonated carboxymethylhydroxyethyl guar, sulfonated carboxymethylguar, and derivatives thereof. Examples of suitable sulfonated cellulose derivatives include sulfonated carboxymethylcellulose, sulfonated carboxymethylhydroxyethylcellulose, sulfonated hydroxyethylcellulose, sulfonated methylhydroxypropylcellulose, sulfonated methylcellulose, sulfonated ethylcellulose, sulfonated propylcellulose, sulfonated ethylcarboxymethylcellulose, sulfonated methylethylcellulose, sulfonated hydroxypropylmethylcellulose, and derivatives thereof. In certain embodiments, the one or more sulfonated gelling agent polymers may comprise a combination of different sulfonated gelling agent polymers.

In certain embodiments of the present invention, the one or more sulfonated gelling agent polymers may be present in the treating fluid in an amount in the range of from about 20 lbs to about 60 lbs of polymer per 1000 gal of the treating fluid. In certain embodiments, the one or more sulfonated gelling agent polymers may be present in the treating fluid in an amount in the range of from about 30 lbs to about 45 lbs per 1000 gal of the treating fluid. Methods of preparing the aqueous treating fluids of the present invention will be recognized by those skilled in the art, with the benefit of this disclosure.

A crosslinking agent optionally may be added, among other purposes, to further enhance the viscosity of the treating fluid. The term "crosslinking agent" is defined herein to include any molecule, atom, or ion that is capable of forming one or more crosslinks between molecules of a polymer and/or between one or more atoms in a single molecule of a polymer. The crosslinking agent may comprise a borate, a metal ion, or similar component that is capable of crosslinking at least two molecules of the sulfonated gelling agent polymer(s). Examples of suitable crosslinking agents that can be utilized include, but are not limited to the following: boron compounds such as boric acid, disodium octaborate tetrahydrate, sodium diborate and pentaborates; ulexite; colemanite; compounds that can supply zirconium IV ions such as zirconium lactate, zirconium lactate triethanolamine, zirconium carbonate, zirconium acetylacetonate and zirconium diisopropylamine lactate; compounds that can supply titanium IV ions such as titanium ammonium lactate, titanium triethanolamine and titanium acetylacetonate; aluminum compounds such as aluminum lactate and aluminum citrate; and compounds that can supply antimony ions. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treating fluid, temperature, and/or the desired delay for the crosslinking agent to crosslink the gelling agent molecules.

In certain embodiments, a crosslinking agent may be included in the treating fluid in an amount in the range of from about 2 lbs to about 40 lbs per 1000 gal of the treating fluid. In certain embodiments, a crosslinking agent may be included in the treating fluid in an amount in the range of from about 4 lbs to about 12 lbs per 1000 gal of the treating fluid.

The treating fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treating fluids of the present invention may be coated with any suitable resin or tackifying agent known to those of ordinary skill in the art. In certain embodiments, the particulates may be present in the treating fluids of the present invention in an amount in the range of from about 0.5 pounds per gallon ("ppg") to about 30 ppg by volume of the treating fluid.

The treating fluids of the present invention also may include internal gel breakers such as enzyme, oxidizing, acid buffer, or delayed gel breakers. The gel breakers may cause the treating fluids of the present invention to revert to thin fluids that can be produced back to the surface, for example, after they have been used to place proppant particles in subterranean fractures. In some embodiments, the gel breaker may be formulated to remain inactive until it is "activated" by, among other things, certain conditions in the fluid (e.g., pH, temperature, etc.) and/or interaction with some other substance. In some embodiments, the gel breaker may be delayed by encapsulation with a coating (e.g., a porous coatings through which the breaker may diffuse slowly, or a degradable coating that degrades downhole.) That delays the release of the gel breaker. In certain embodiments, the gel breaker used may be present in the treating fluid in an amount in the range of from about 0.0001% to about 200% by weight of the gelling agent. One of ordinary skill in the art, with the benefit of this disclosure, will recognize the type and amount of a gel breaker to include in certain treating fluids of the present invention based on, among other factors, the desired amount of delay time before the gel breaks, the type of gelling agents used, the temperature conditions of a particular application, the desired rate and degree of viscosity reduction, and/or the pH of the treating fluid.

The treating fluids of the present invention optionally may include one or more of a variety of well-known additives, such as gel stabilizers, fluid loss control additives, scale inhibitors, corrosion inhibitors, catalysts, clay stabilizers, biocides, bactericides, friction reducers, gases, foaming agents, surfactants, iron control agents, solubilizers, pH adjusting agents (e.g., buffers), and the like. For example, in some embodiments, it may be desired to foam a treating fluid of the present invention using a gas, such as air, nitrogen, or carbon dioxide. Those of ordinary skill in the art, with the benefit of this disclosure, will be able to determine the appropriate additives for a particular application.

The treating fluids of the present invention may be prepared by any method suitable for a given application. For example, certain components of the treating fluid of the present invention (e.g., crosslinkable polymers, biopolymers, etc.) may be provided in a pre-blended powder, which may be combined with the aqueous base fluid at a subsequent time. In preparing the treating fluids of the present invention, the pH of the aqueous base fluid may be adjusted, among other purposes, to facilitate the hydration of the gelling agent. The pH range in which the gelling agent will readily hydrate may depend upon a variety of factors (e.g., the components of the gelling agent, etc.) that will be recognized by one skilled in the art. This adjustment of pH may occur prior to, during, or subsequent to the addition of the gelling agent and/or other components of the treating fluids of the present invention. For example, the treating fluids of the present invention may comprise an ester that releases an acid once placed downhole that is capable of, inter alia, reducing the pH and/or viscosity of the treating fluid. After the pre-blended powders and the aqueous base fluid have been combined, crosslinking agents and/or other suitable additives may be added prior to introduction into the well bore. Those of ordinary skill in the art, with the benefit of this disclosure will be able to determine other suitable methods for the preparation of the treating fluids of the present invention.

The treating fluids of the present invention may be used in any subterranean operation wherein a fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), "frac-pack" treatments, well bore clean-out treatments, and other suitable operations where a treating fluid of the present invention may be useful.

To facilitate a better understanding of the present invention, the following examples of certain aspects of some embodiments are given. In no way should the following examples be read to limit, or define, the scope of the invention.

EXAMPLES

Example 1

To demonstrate the stability of sulfonated gelling agent polymers to potassium chloride, the viscosity of a 0.5% solution of sulfonated guar polymer was compared to that of a 0.5% solution of carboxymethyl guar at 75° F. Viscosity measurements were made with increasing additions of potassium chloride.

The results are shown in Table 1 below. The viscosity of carboxymethyl guar decreases significantly with initial additions of potassium chloride. The sulfonated polymer basically maintains its viscosity.

TABLE 1

Viscosity After KCl Addition

| | Viscosity, cP | |
|---|---|---|
| % KCl | CMG* | SULF* |
| 0 | 26.34 | 28.7 |
| 0.25 | 20.29 | — |
| 0.5 | 20.15 | — |
| 1 | 19.08 | 27.3 |
| 2 | 18.75 | 26.3 |
| 3 | 18.82 | 25.5 |
| 4 | 18.69 | 24.8 |
| 5 | 18.49 | 24.2 |
| 6 | 18.19 | 23.6 |
| 7 | 18.14 | 23.2 |
| 8 | 17.89 | 22.9 |
| 9 | 17.68 | 22.3 |
| 10 | 17.65 | 22.2 |
| 11 | 17.90 | 22.5 |
| 12 | 17.61 | 22.6 |

*CMG = Carboxymethyl guar
*SULF = Sulfonated guar

Example 2

To demonstrate the superior stability of sulfonated gelling agent polymers in the presence of divalent cations, a 0.5% solution of sulfonated guar polymer was compared to that of a 0.5% solution of carboxymethyl guar. Viscosity measurements were made at 75° F. with increasing additions of calcium chloride.

The results are shown in Table 2 below. The viscosity of carboxymethyl guar decreases significantly with initial additions of calcium chloride. The sulfonated polymer basically maintains its viscosity.

TABLE 2

Viscosity After $CaCl_2$ Addition

| | Viscosity, cP | |
|---|---|---|
| % $CaCl_2$ | CMG* | SULF* |
| 0 | 24.4 | 28.9 |
| 0.125 | 19.9 | 28.7 |
| 0.25 | 19.5 | 28.9 |
| 0.50 | 19.8 | 28.9 |
| 0.75 | — | 28.9 |
| 1.0 | 20.6 | 28.9 |
| 2.0 | 21.7 | 28.9 |
| 3.0 | 22.2 | 29.1 |
| 4.0 | 22.7 | 29.1 |
| 5.0 | 23 | 29.0 |
| 6.0 | 23 | 29.1 |
| 10 | 26 | 30.6 |

*CMG = Carboxymethyl guar
*SULF = Sulfonated guar

Example 3

The thermal stability of a carboxymethyl guar treating solution was compared to a sulfonated guar polymer treating solution of this invention. The polymer solutions were prepared at a concentration of 0.5 weight percent in deionized water. In two of the tests, a gel stabilizing agent comprised of sodium thiosulfate, was added as indicated in Table 3 below. The polymer solutions were hydrated at pH 7 and the viscosities were measured at 75° F. The solutions were sparged with nitrogen and heated in a pressure vessel under 100 psi to 300° F. for 4 hours. The solutions were then cooled to 75° F. and the viscosities were measured again.

As shown in Table 3, the solutions of sulfonated guar polymer had superior thermal stability compare to the carboxymethyl guar.

TABLE 3

Effect of Time and Temperature on Viscosity

| Sample | Gelling Agent Polymer | Gel Stabilizing Agent lb/1000 gal | Initial Viscosity cP @ 75 F. | Final Viscosity cP @ 75 F.* | % of Initial Viscosity* |
|---|---|---|---|---|---|
| 1 | Carboxymethylguar | None | 39.02 | 2.2 | 5.6 |
| 2 | Carboxymethylguar | 20 | 36.37 | 5.65 | 15.5 |
| 3 | Sulfonated Guar | None | 40.48 | 4.4 | 10.9 |
| 4 | Sulfonated Guar | 20 | 38.63 | 10.74 | 27.8 |

*after 4 hours at 300° F.

Therefore, the present invention is well adapted to attain the ends and advantages mentioned as well as those that are inherent therein. While numerous changes may be made by those skilled in the art, such changes are encompassed within the spirit of this invention as defined by the appended claims.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the appended claims have their plain, ordinary meaning unless otherwise explicitly and clearly defined by the patentee.

What is claimed is:

1. A method of forming one or more fractures in a subterranean formation penetrated by a well bore comprising:
   providing a high ionic strength treating fluid that comprises water and one or more sulfonated gelling agent polymers wherein the high ionic strength treating fluid comprises one or more water soluble salts in a concentration of greater than about 8% by weight of the treating fluid; wherein the one or more sulfonated gelling agent polymers comprise a sulfonated biopolymer selected from the group consisting of sulfonated xanthan, sulfonated scleroglucan, sulfonated succinoglycan, and any combination thereof; and
   introducing the treating fluid into the subterranean formation at a rate and pressure sufficient to create or enhance one or more fractures therein.

2. The method of claim 1 wherein the water is selected from the group consisting of produced water, flowback water, and any combination thereof.

3. The method of claim 1 wherein the one or more sulfonated gelling agent polymers further comprises a sulfonated synthetic polymer.

4. The method of claim 1 wherein the one or more sulfonated gelling agent polymers further comprises a sulfonated polysaccharide selected from the group consisting of sulfonated galactomannan gums, sulfonated cellulose, and any combination thereof.

5. The method of claim 1 wherein the sulfonated biopolymer comprises a sulfonated galactomannan gum selected from the group consisting of sulfonated guar gum, sulfonated gum arabic, sulfonated gum ghatti, sulfonated gum karaya, sulfonated tamarind gum, sulfonated locust bean gum, and any combination thereof.

6. The method of claim 1 wherein the one or more sulfonated gelling agent polymers further comprises a sulfonated polysaccharide derivative selected from the group consisting of sulfonated carboxyalkyl derivatives of guar, sulfonated hydroxyalkyl derivatives of guar, sulfonated cellulose derivatives, and any combination thereof.

7. The method of claim 6 wherein the one or more sulfonated gelling agent polymers comprises a sulfonated cellulose derivative selected from the group consisting of sulfonated carboxymethylcellulose, sulfonated carboxymethylhydroxyethylcellulose, sulfonated hydroxyethylcellulose, sulfonated methylhydroxypropylcellulose, sulfonated methylcellulose, sulfonated ethylcellulose, sulfonated propylcellulose, sulfonated ethylcarboxymethylcellulose, sulfonated methylethylcellulose, sulfonated hydroxypropylmethylcellulose, and any combination thereof.

8. The method of claim 6 wherein the sulfonated polysaccharide derivative comprises sulfonated guar.

9. The method of claim 1 wherein the one or more sulfonated gelling agent polymers are present in the aqueous treating fluid composition in an amount in the range of from about 20 pounds to about 60 pounds per 1000 gallons of the aqueous treating fluid composition.

10. The method of claim 1 wherein the treating fluid further comprises a crosslinking agent.

11. The method of claim 10 wherein the crosslinking agent is present in the treating fluid in an amount in the range of from about 2 pounds to about 40 pounds per 1000 gallons of the treating fluid.

* * * * *